(12) United States Patent
Monteiro et al.

(10) Patent No.: US 12,234,983 B2
(45) Date of Patent: Feb. 25, 2025

(54) REFRIGERATING APPLIANCE LIGHTING SYSTEM

(71) Applicant: WHIRLPOOL CORPORATION, Benton Harbor, MI (US)

(72) Inventors: Monica Da Costa Monteiro, Joinville (BR); Vanessa Oliveira, Joinville (BR); Caroline Paiva Torres, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 500 days.

(21) Appl. No.: 17/692,468

(22) Filed: Mar. 11, 2022

(65) Prior Publication Data
US 2023/0288052 A1    Sep. 14, 2023

(51) Int. Cl.
| | |
|---|---|
| F21V 33/00 | (2006.01) |
| F25D 27/00 | (2006.01) |
| G02F 1/157 | (2006.01) |
| H05B 47/105 | (2020.01) |
| H05B 47/165 | (2020.01) |
| F21W 131/305 | (2006.01) |

(52) U.S. Cl.
CPC ........ F21V 33/0044 (2013.01); F25D 27/005 (2013.01); G02F 1/157 (2013.01); H05B 47/105 (2020.01); H05B 47/165 (2020.01); *F21W 2131/305* (2013.01)

(58) Field of Classification Search
CPC . F21V 33/0044; H05B 47/165; H05B 47/105; F25D 27/005; G02F 1/157; F21W 2131/305
USPC ....................................................... 359/265
See application file for complete search history.

(56) References Cited

U.S. PATENT DOCUMENTS

| | | | |
|---|---|---|---|
| 10,105,006 B2 | 10/2018 | Alexander | |
| 10,222,117 B2 | 3/2019 | Seo | |
| 10,274,900 B2 | 4/2019 | Braunberger | |
| 2016/0363806 A1 | 12/2016 | Sinderbrand et al. | |

(Continued)

FOREIGN PATENT DOCUMENTS

| | | |
|---|---|---|
| BR | PI1000799 A2 | 1/2012 |
| CN | 105206176 A | 12/2015 |
| CN | 207487219 U | 6/2018 |

(Continued)

OTHER PUBLICATIONS

Already Possible by Gauzy see through Smart Refrigerator YouTube video; accessed at https://www.youtube.com/watch?v=ylGu2yVRYjc, Jun. 25, 2018.

(Continued)

*Primary Examiner* — William Choi
(74) *Attorney, Agent, or Firm* — McGarry Bair PC

(57) ABSTRACT

A refrigerating appliance includes a lighting system having a lighting device arranged to operatively illuminate the interior of the refrigerating appliance based on a predetermined condition. The lighting device includes a light source and an electrochromic device. The light source is arranged to selectively provide a first light to the electrochromic device. The electrochromic device is selectively operable to emit a second light within the interior. The color, color temperature, and diffusion of the second light can be indicative of a status of the refrigerating appliance and can be selectable by a user.

20 Claims, 5 Drawing Sheets

(56) References Cited

U.S. PATENT DOCUMENTS

2018/0294386 A1* 10/2018 Kaneko .................. C03C 8/24
2021/0035063 A1    2/2021 Cartwright

FOREIGN PATENT DOCUMENTS

| CN | 111609381 A | 9/2020 |
| CN | 111610678 A | 9/2020 |
| DE | 102007021298 A1 | 11/2008 |
| DE | 102016000283 A1 | 6/2017 |
| EP | 3822566 A1 | 5/2021 |
| JP | H0345880 A | 2/1991 |
| WO | 2012031873 A2 | 3/2012 |

OTHER PUBLICATIONS

European Search Report for Counterpart EP23160787.0, Dated Jul. 25, 2023, 6 Pages.

* cited by examiner

REFRIGERATING APPLIANCE LIGHTING SYSTEM

TECHNICAL FIELD

The present disclosure generally relates to a refrigerating appliance, and more specifically to a lighting system for a refrigerating appliance.

BACKGROUND OF THE INVENTION

Refrigerating appliances, such as refrigerators, freezers, or other appliances for storing containers of food substances, can be found within a kitchen environment, garages, bars, restaurants, food stores, and other places, there can be numerous containers of various types, sizes, and shapes that are configured to store all matter of food substances. Such refrigerating appliance can include a cabinet defining a storage chamber, which can be provided as an interior compartment having an open face. The storage chamber can also be provided as a refrigerator compartment (e.g., a drawer), or can be provided as a refrigerator compartment and a freezer compartment.

Typically, such appliances can include a variety of interior lighting arrangements, for example to illuminate the food stored therein, to provide accent lighting, or to illuminate status indicators or other indicia.

BRIEF SUMMARY OF THE INVENTION

In one aspect, illustrative aspects in accordance with the present disclosure relate to a refrigerating appliance comprising: a cabinet defining an interior; a door coupled to the cabinet and configured to moveably open and close the interior; a lighting device arranged to operatively illuminate the interior based on a predetermined condition, the lighting device comprising a light source and an electrochromic device, the light source arranged to selectively provide a first light to the electrochromic device, the electrochromic device selectively operable to emit a second light within the interior; at least one energy source coupleable to the lighting device and the electrochromic device; a controller module communicatively coupled to the at least one energy source, and configured to selectively trigger the at least one energy source to provide at least one of a first voltage having a first magnitude and a second voltage having a second magnitude to the electrochromic device; and wherein, in response to the at least one of a first voltage and a second voltage, the electrochromic device is configured to modify at least one of an opacity of the electrochromic device, a color of the first light, a color temperature of the first light, and a dispersion of the first light, to define the second light.

In another aspect, illustrative aspects in accordance with the present disclosure relate to a lighting system for a refrigerating appliance, comprising: a lighting device mountable in an interior of the refrigerating appliance, to operatively illuminate the interior based on a predetermined condition, the lighting device comprising a light source and an electrochromic device, the light source configured to selectively provide a first light to the electrochromic device, the electrochromic device selectively operable to emit a second light to the interior; at least one energy source coupleable to the lighting device and the electrochromic device; a controller module communicatively coupled to the at least one energy source and configured to selectively trigger the at least one energy source to provide at least one of a first voltage and a second voltage to the electrochromic device based on the predetermined condition; and wherein, in response to the at least one of a first voltage and a second voltage the electrochromic device is configured to modify at least one of an opacity of the electrochromic device, a color of the first light, a color temperature of the first light, and a dispersion of the first light, to define the second light.

Other illustrative aspects in accordance with the present disclosure relate to a method of illuminating an interior of a refrigerating appliance comprising a lighting device disposed within the interior, the lighting device including a light source optically coupled to an electrochromic device, and selectively operable to provide a first light to the electrochromic device, and to emit a second light therefrom, the method comprising: selectively operating the lighting device to emit the first light; providing at least one of a first voltage and a second voltage to the electrochromic device; modifying at least one of an opacity of the electrochromic device, a color of the first light, a color temperature of the first light, and a dispersion of the first light, to define the second light; and emitting the second light within the interior.

DETAILED DESCRIPTION OF EMBODIMENTS OF THE INVENTION

Figure 1:
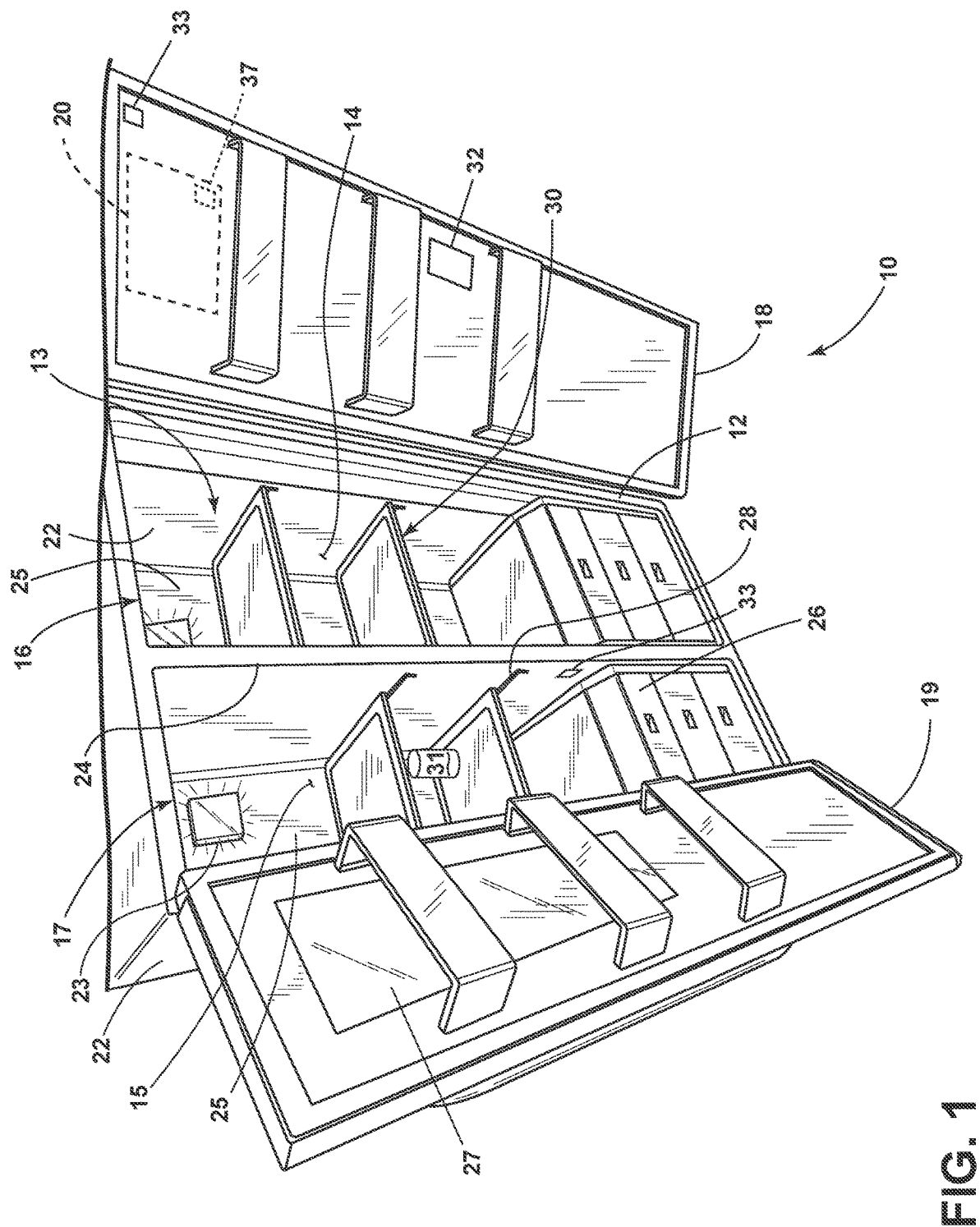
FIG. 1 illustrates a perspective view of a refrigerating appliance in the form of a refrigerator having doors shown in an open position, in accordance with a non-limiting aspect of the present disclosure.

As used herein, the term "set" or a "set" of elements can be any non-zero number of elements, including only one. The exemplary drawings are for purposes of illustration only and the dimensions, positions, order and relative sizes reflected in the drawings attached hereto can vary.

Additionally, as used herein, a "processor", or "controller module" can include a component configured or adapted to provide instruction, control, operation, or any form of communication for operable components to affect the operation thereof. A processor or controller module can include any known processor, microcontroller, or logic device, including, but not limited to: Field Programmable Gate Arrays (FPGA), an Application Specific Integrated circuit (ASIC), a Proportional controller (P), a Proportional Integral controller (PI), a Proportional Derivative controller (PD), a Proportional Integral Derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a processor or controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, the term "electrochromic" material refers to a material capable of changing at least one of color, opacity, visible transmittance, near infrared (NIR) transmittance, or reflectance. The change can be persistent but reversible in response to an electrochemical reaction. The change in color, opacity, visible transmittance, NIR transmittance, or reflectance can result in a change in one or more of the color, color temperature, or diffusion of a light transmitted therethrough. The electrochemical reaction can be selectively triggered by an application of a voltage, electrical current, or electric charge. The electrochemical reaction can be an electrochemically induced oxidation-reduction reaction. The change in at least one of color, opacity, visible transmittance, NIR transmittance, or reflectance can result from the generation of different visible region electronic absorption bands in the material when switching between oxidation-reduction states. The color change can be between a transparent (e.g., "bleached") state and a colored state, or between two colored states. The degree of bleaching or coloring can be based on the magnitude of the applied voltage, current, or charge.

As used herein, the term "light" can refer individually or collectively to electromagnetic (EM) radiation in one or more of the visual (VIS), ultra-violet (UV), or Infrared (IR) spectrums.

FIG. 1 illustrates a refrigerating or food storage appliance or refrigeration apparatus, illustrated herein as a refrigerating appliance 10 that can be provided within a storage and consumption environment, such as a kitchen. The refrigerating appliance 10 comprises a cabinet 12 at least partially defining an interior 13, which can be provided as at least one compartment 14, and illustrated herein, by way of non-limiting example, as a first compartment 14 and a second compartment 15, that can hold a plurality of containers 31 or other food items. Non-limiting aspects of the refrigerating appliance 10 can also include a first door 18, and a second door 19, a set of side walls 22 at least one drawer 26, at least one shelf 30, a lighting device 23, and a control module 20. The control module can include a memory 37.

Each of the first and second compartments 14, 15 can include and at least partially define at least one open face, illustrated herein as a first open face 16, and a second open face 17, respectively, such that the first compartment 14 includes the first open face 16 while the second compartment 15 includes the second open face 17. The first and second open faces 16, 17 can also function as access openings to the first and second compartments 14, 15, respectively. Each of the first and second compartments 14, 15 can further include at least one closure, illustrated herein as the first door 18, and the second door 19, respectively, such that the first compartment 14 includes the first door 18 while the second compartment 15 includes the second door 19. The first and second doors 18, 19 further at least partially define the first and second compartments 14, 15 when the first and second doors 18, 19 selectively close the open faces 16, 17, respectively.

The first and second doors 18, 19 are coupled to or movably mounted to the cabinet 12 and configured to be movable relative to the first and second open faces 16, 17 between an opened position, as shown, and a closed position (not shown), so as to selectively open or close the first and second open faces 16, 17, respectively, and to selectively provide access into the first and second compartments 14, 15 through the first and second open faces 16, 17. By way of non-limiting example, the first and second doors 18, 19 can be rotatable between the closed position and the opened position relative to the cabinet 12, and further the first and second doors 18, 19 can be hingedly coupled to the cabinet 12 for movement between the opened position and the closed position.

In non-limiting aspects, refrigerating appliance 10 can include one or more viewing panels or windows 27. As illustrated herein, by way of non-limiting example, a portion of the first door 18 can comprise a window arranged to allow viewing of the interior of the first compartment 14 and any contents or containers 31 disposed therein without need of opening the first door 18. Other aspects are not so limited and the refrigerating appliance 10 can optionally be provided with one or more windows on any one or more of the first door 18, second door 19, side walls 22, or any other desired location on the refrigerating appliance 10 without departing from the scope of the disclosure herein. In non-limiting aspects, the windows 27 can be formed of clear glass or reflective glass, to allow the interior of the refrigerating appliance 10 (e.g., first compartment 14) to be visible when the interior of the refrigerating appliance 10 is illuminated. In other non-limiting aspects, the window 27 can be formed using acrylic or other similar materials. Regardless of the particular material selected to form the windows 27, the windows 27 can comprise any desired material or combination of materials such that the window 27 is translucent on at least its internal face. In some aspects, the window 27 can comprise the entire surface of the first door 18 or the second door 19, or both. In other non-limiting aspects, the window 27 can comprise a portion of the surface of the first door 18, or the second door 19, or both.

As illustrated herein, in non-limiting aspects, the refrigerating appliance 10 can include the first and second compartments 14, 15 arranged as side-by-side compartments, at least partially defined by side walls 22 and separated by a center partition or center wall 24. Each of the first and second compartments 14, 15 can further comprise a back wall 25. In other non-limiting aspects, the first and second compartments 14, 15 can alternatively be arranged as upper and lower compartments. By way of non-limiting example, the first compartment 14 can comprise one refrigerator first compartment 14 at least partially defining the refrigerator first open face 16 and closable by the refrigerator door 18, and the second compartment 15 can comprise one freezer compartment 15 at least partially defining the freezer open face 17 and closable by the freezer door 19. The first and second compartments 14, 15 can be cooled to predetermined refrigerating and freezer temperatures by operation of a refrigeration system 63 (shown in FIG. 3). A desired temperature differential between the first and second compartments 14, 15 can be maintained through the separation of the first and second compartments 14, 15 by the intervening insulated partition, herein the center wall 24.

While the first and second compartments 14, 15 are illustrated herein as the side-by-side refrigerator compartment 14 and freezer compartment 15, it will be understood that other arrangements of first and second compartments 14, 15 is contemplated. For example, both of the first and second compartments 14, 15 can be provided as refrigerator compartments 14, 15, such as with an optional lower portion, which can further optionally include at least one drawer 26, being provided as a freezer compartment or portion. The number and arrangement of refrigerated compartments 14, 15, either a chilled compartment 14, 15 or a freezing compartment 14, 15 are not germane to the present disclosure and are given by way of non-limiting example in order to illustrate one possible environment. While the refrigerating appliance is illustrated as a side-by-side, front-opening refrigerating appliance 10, the aspects of the present disclosure can have applicability in other refrigerating appliances, non-limiting examples of which include stacked style freezer-on-top or freezer-on-bottom refrigerators, drawer-style refrigerators or freezers, beverage coolers, free-standing refrigerators, build-in refrigerators, display refrigerators, a storage or refrigerating cabinet, a storage or refrigerated drawer, a beverage storing appliance, a freezer, a wine cellar, etc.

At least one of the first and second compartments 14, 15 can include at least one shelf 30 provided within the respective compartment 14, 15. In addition, or alternatively, the shelf 30 can be provided such that the at least one drawer 26 is slidably mounted directly beneath the shelf 30, with the shelf 30 selectively closing an open top of the drawer 26. The at least one shelf 30 can be adapted for slidable, tiltable, a combination thereof, or any other suitable type of movement, out of and into the compartment 14, 15, such as via shelf guides 28.

The at least one shelf 30 is configured to provide a support surface upon which food items and containers 31 can be placed to be stored and refrigerated. The containers 31 can be any sort of container 31 for holding a food substance. The containers 31 can be commercially available containers 31 that are obtained by a user already containing a food substance, or storage containers 31 into which a food substance is placed by a user for refrigerated storage outside of the original packaging. Containers 31 can be transparent or opaque, with any suitable level of opacity being contemplated. The food substance within the containers 31 can be any food substance, non-limiting examples of which include liquids, solids, gelatinous substances, mixtures, dry goods, etc. In one example, the containers 31 are used to contain food substances that are non-solid, non-limiting examples of which can include milk, juices, other beverages, ketchup, other condiments, mayonnaise, jellies, sauces, creams, etc.

As illustrated herein, in non-limiting aspects, the refrigerating appliance 10 can include the at least one lighting device 23 arranged to emit light to illuminate the interior 13. While the non-limiting example illustrated in FIG. 1 depicts the lighting device 23 mounted or disposed on the back wall 25, other aspects are not so limited. In other non-limiting aspects, the lighting device 23 can be disposed in any desired location within the interior 13 of the refrigerating appliance 10, including, but not limited to the center wall 24, the first door 18, the second door 19, back wall 25, side wall 22, and combinations thereof. It is further contemplated that the lighting device 23 can be additionally, or alternatively mounted or disposed to illuminate exterior accessory (e.g., an ice dispenser, water dispenser, etc). The interior lighting of the refrigerating appliance 10, in turn, can be done in a variety of ways and serve various purposes. For example, the lighting device 23 can be arranged to illuminate the interior 13 to enable viewing the containers 31 stored therein. In various aspects, the color of the light provided or emitted by the lighting device 23 can be selectable based on predetermined conditions, user input, or both. Additionally, or alternatively, the color temperature of the light provided or emitted by the lighting device 23 can be selectable based on predetermined conditions, user input, a status of the refrigerating appliance 10, or combinations thereof. In non-limiting aspects, the color or color temperature of the light provided or emitted by the lighting device 23 can be predetermined based on an operating status of the refrigerating appliance 10. In other non-limiting aspects, the dispersion of the light provided or emitted by the lighting device 23 can additionally or alternatively be selectable based on predetermined conditions, a status of the refrigerating appliance 10, a user input, or combinations thereof.

The refrigerating appliance 10 can further comprise a control assembly, or control unit illustrated herein as a controller module 20, for controlling the operation of the lighting device 23. In non-limiting aspects, the control module 20 can optionally be arranged to control other aspects of the refrigerating appliance 10, and coupled with various working components of the refrigerating appliance 10 to control the operation of the working components and to implement cycles of refrigeration. One or more sensors 33 can be disposed in various locations within the refrigeration appliance 10 and communicatively coupled to the controller module 20. The sensors 33 can comprise any desired conventional sensor 33 including, but not limited to, a temperature sensor, a humidity sensor, a pressure sensor, a light sensor, a photo-electric sensor, a proximity sensor, a voltage sensor, or combinations thereof. The one or more sensors 33 can be arranged to provide a signal input to the controller module 20 indicative of a status of the refrigerating appliance 10. For example, the status of the refrigerating appliance 10 can include, without limitation a temperature of the interior 13, a temperature of the first and second compartments 14, 15, a temperature difference between the first and second compartments 14, 15, a relative humidity in the interior 13, a position of the first and second doors 18, 19, a light intensity within the interior 13, an operating status of the refrigerating appliance 10, and combinations thereof.

While the controller module 20 is illustrated herein as being provided within the first door 18, it will be understood that any suitable location can be used for the controller module 20, including within the interior 13 or within the second door 19 rather than within the first door 18. In other non-limiting aspects, the controller module 20 can be disposed remotely from the refrigerating appliance 10. In non-limiting aspects, the control assembly can further include a user interface 32 (not shown) that can be operably coupled with the controller module 20 and can provide a signal input and signal output function for the controller module 20. In non-limiting aspects, the user interface 32 can enable a user to input or select preferences for predetermined parameters associated with the operation of the refrigerating appliance 10. The user inputs, selected preferences, predetermined parameters can be saved to the memory 37. In various aspects, the controller module 20 can include or be communicatively coupled to the memory 37. The user interface 32 can be configured to enable a user to select parameters indicative of one or more of a preferred color, color temperature, or diffusion of the light provided or emitted by the lighting device 23. In some aspects, one or more of a preferred color, color temperature, or diffusion of the light provided or emitted by the lighting device 23 can be based on a selected predetermined condition. For example, in non-limiting aspects, the predetermined condition can be a status of the refrigerating appliance 10. For example, in certain aspects, a user can provide a signal input via the user interface 32 to the controller module 20 to cause the lighting device 23 to emit the second light 40a, defining a particular color having a first color temperature, in the event either the first door 18 or the second door 19 is opened, and to emit the second light 40a defining the particular color comprising a second color temperature, in the event both the first and second doors 18, 19 are opened. By way of another non-limiting example, in certain aspects, a user can provide a signal input to the controller module 20 via the user interface 32 to cause the lighting device 23 to emit the second light 40a defining a particular color based on a sensed first temperature range in the interior 13, and to emit the second light 40a defining a different color based on a sensed second temperature range in the interior 13. In some non-limiting aspects, the user interface 32 can enable the user to select various predetermined conditions (e.g., a temperature threshold) to trigger the lighting device 23 to illuminate the interior 13. Other aspects are not so limited, and the controller module 20 can be configured to cause the lighting device 23 to emit any desired color having any desired color temperature, at any desired diffusion, to illuminate the interior 13 based on any desired predetermined condition without departing from the scope of the disclosure herein.

It will be appreciated that while FIG. 1 depicts the user interface 32 as coupled to the refrigerating appliance 10 (i.e., on the first door 18), other aspects are not so limited. In some aspects the user interface 32 can comprise a remote device (e.g., a portable computer) communicatively coupled to the controller module 20. Other communications paths and methods can also be included in the refrigerating appliance 10 and can allow the controller module 20 to communicate with a user and the memory 37 in a variety of ways. For example, the controller module 20 can be configured to send a text message to the user, send an electronic mail to the user, or provide audio information to the user either through the refrigerating appliance 10 or utilizing another device such as a mobile phone.

The controller module 20 can include a machine controller and any additional controllers provided for controlling any of the components of the refrigerating appliance 10. For example, the controller module 20 can include the machine controller and a refrigeration system controller. Many known types of controllers can be used for the controller module 20. It is contemplated that the controller can be a microprocessor-based controller that implements control software and sends/receives one or more electrical signals to/from each of the various working components to implement the control software. As an example, proportional control (P), proportional integral control (PI), and proportional derivative control (PD), or a combination thereof, a proportional integral derivative control (PID), can be used to control the various components of the refrigerating appliance 10.

Figure 2:
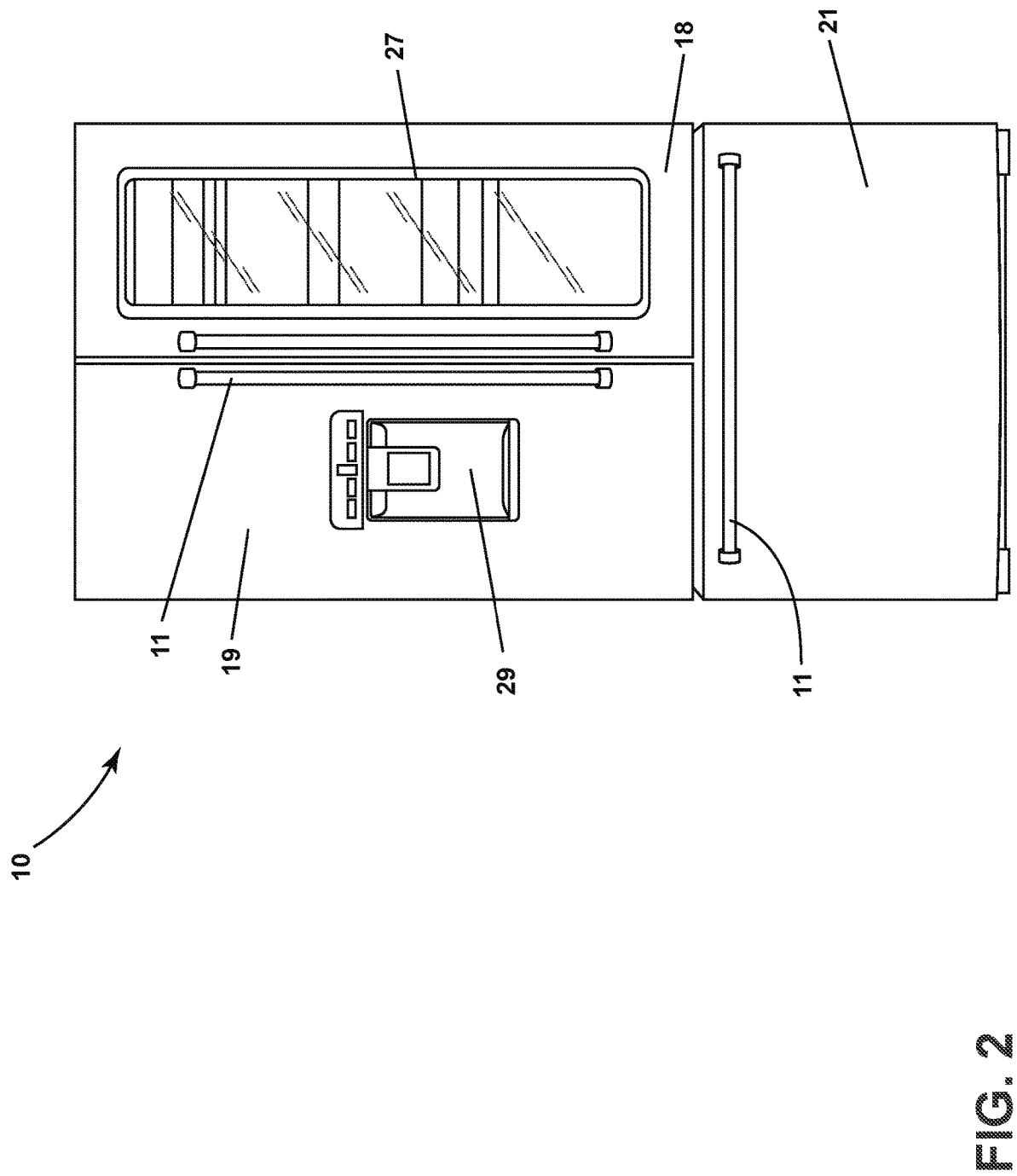
FIG. 2 illustrates an isometric front view of a refrigerating appliance in the form of a refrigerator having doors shown in a closed position, in accordance with a non-limiting aspect of the present disclosure.

FIG. 2 illustrates a non-limiting alternative aspect of the refrigeration appliance 10, having the first and second doors 18, 19 shown in the closed position. In this example, a third door 21 is provided to enable selective access to a third compartment (not shown) such as a freezer compartment. Each door 18, 19, 21 can include a handle 11 to facilitate manually opening and closing by a user. Additionally, in the non-limiting aspect of FIG. 2, the window 27 depicted as provided on a portion of the first door 18. An auxiliary device 29 is shown disposed on the second door 19. In non-limiting aspects, the auxiliary device 29 can include an ice dispenser, a water dispenser, or any other desired device, without departing from the scope of the disclosure herein. For example, in some non-limiting aspects, the auxiliary device 29 can include the user interface 32. In some non-limiting aspects, the lighting device 23 can be configured and disposed to illuminate the auxiliary device 29.

Figure 3:
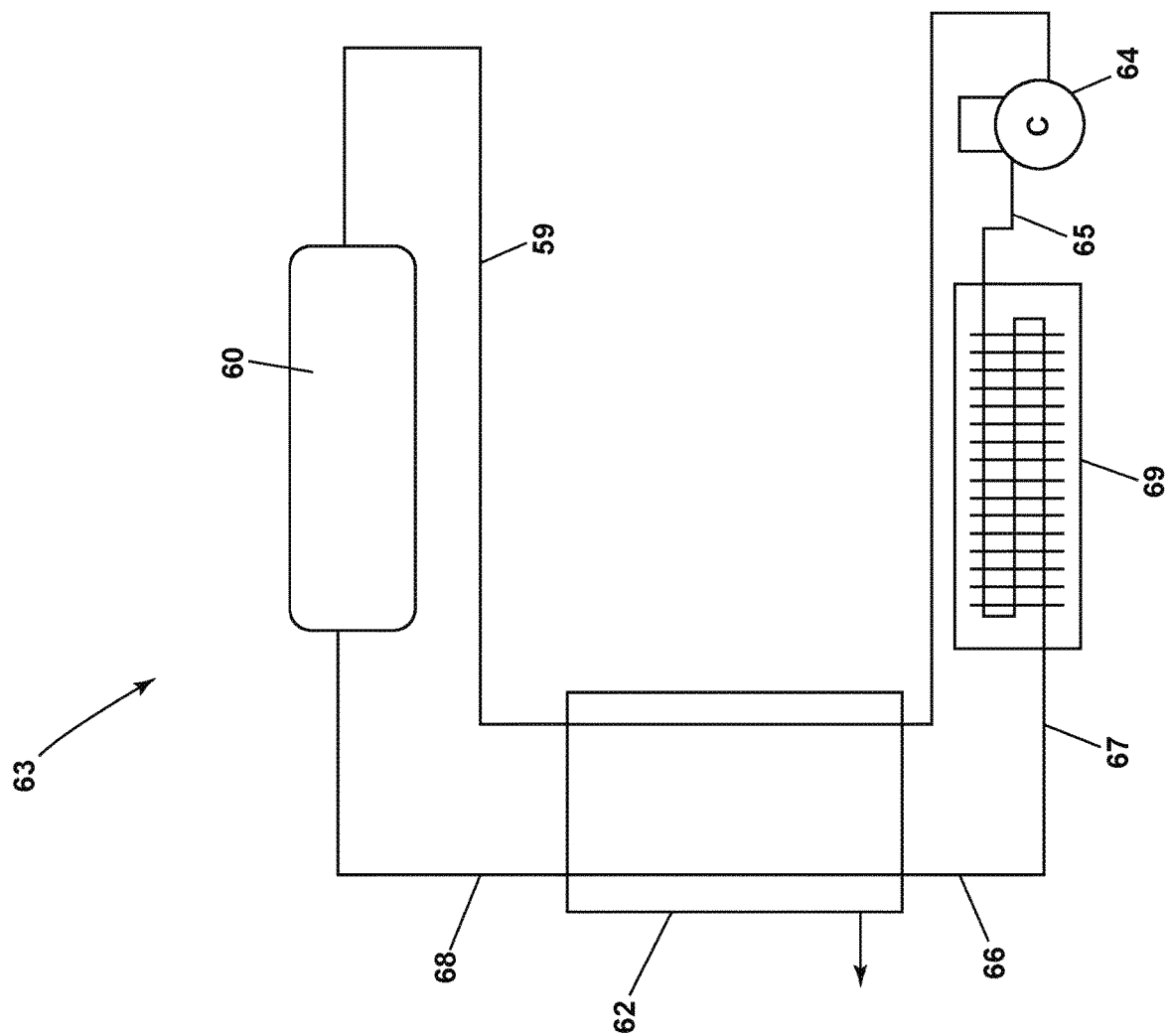
FIG. 3 illustrates a schematic diagram of a refrigeration system in accordance with a non-limiting aspect of the present disclosure.

Referring now to FIG. 3, the refrigeration system 63 is shown in schematic form and can be provided as a closed refrigeration system 63 comprising a compressor 64, a condenser 69, an optional heat exchanger 62, and an evaporator 60. The compressor 64 and the condenser 69 can be fluidly coupled through a high-pressure vapor line 65. The condenser 69 and the evaporator 60 can be fluidly coupled through a high-pressure liquid line 67, a high-pressure liquid capillary tube 66, and a low-pressure liquid/vapor tube 68. The low-pressure liquid/vapor tube 68 can include or can act as an expansion valve for the refrigeration system 63, such as by the low-pressure liquid/vapor tube 68 having a larger size or diameter than the high-pressure liquid capillary tube 66, allowing the low-pressure liquid/vapor tube 68 to effect expansion of the high-pressure liquid into the low-pressure vapor. The evaporator 60 and the compressor 64 can be fluidly coupled through a low-pressure liquid/vapor suction line 59.

The tubes 66, 68 and the suction line 59 can pass through the heat exchanger 62. Within the heat exchanger 62, the tubes 66, 68 and the suction line 59 can be in thermal juxtaposition. Heat energy can be transferred from the low-pressure liquid/vapor in the suction line 59 to the tubes 66, 68 along the juxtaposed portions, thereby contributing to the efficiency of the refrigeration system 63 by optimal conversion of the high-pressure liquid to the low-pressure vapor.

Figure 4:
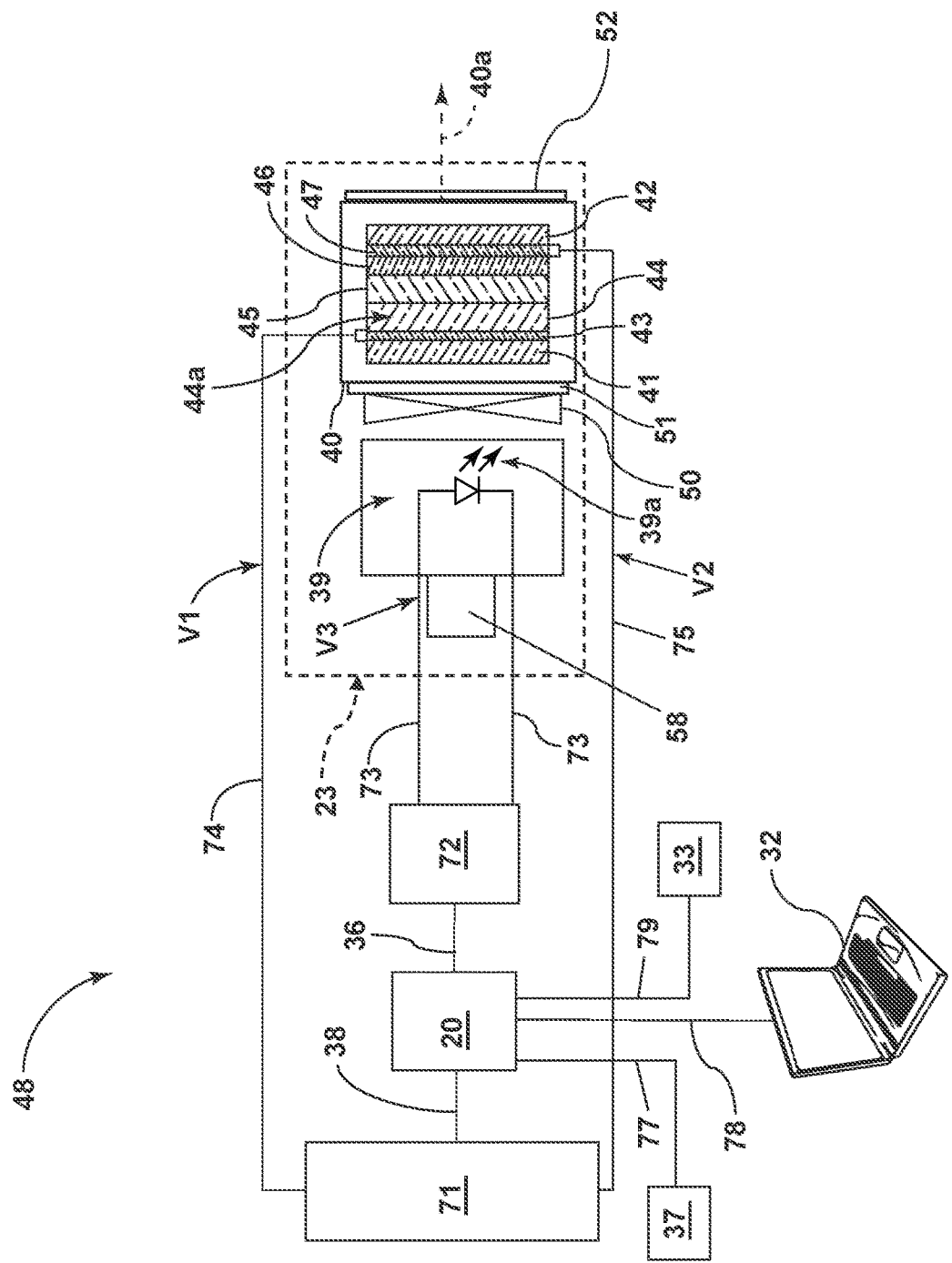
FIG. 4 illustrates a lighting system for a refrigerating appliance in accordance with non-limiting aspects of the present disclosure.

Referring now to FIG. 4, a lighting system 48 is shown in schematic form in accordance with a non-limiting aspect. The lighting system 48 can comprise the lighting device 23 having a light source 39 optically coupled to an electrochromic device 40. The light source 39 can be mounted on a base 58. The light source 39 can emit a first light 39a receivable by the electrochromic device 40. The lighting system can include at least one energy source, such as a first energy source 71 and a second energy source 72. The first energy source 71 can be electrically coupled via a first conductive line 74 and a second conductive line 75 to the electrochromic device 40 to selectively provide a first voltage V1 and a second voltage V2, respectively, thereto. It will be appreciated that the first voltage V1 can define a first magnitude and a first polarity, and the second voltage can define a second magnitude and a second polarity. In non-limiting aspects, the polarity of the first voltage V1 can be opposite the polarity of the second voltage V2. The first voltage V1 and second voltage V2 can thus cooperatively define a voltage differential therebetween. In non-limiting aspects, the second energy source 72 can be electrically coupled via a set of power lines 73 to the light source 39 to provide a third voltage V3 thereto. The light source 39 can be arranged to illuminate in response to the third voltage V3 in a known manner. The electrochromic device 40 can be configured to alter or modify the received first light 39a to define a second light 40a, and emit the second light 40a therefrom.

The controller module 20 can be communicatively coupled via a first communication line 38 to the first energy source 71 to selectively control or trigger the first energy source 71 to output or provide at least one of the first voltage V1 and second voltage V2 therefrom. In some non-limiting aspects, the controller module 20 can additionally, or alternatively, be communicatively coupled to the second energy source 72 via a second communication line 36 to selectively control or trigger the output of the third voltage V3 therefrom. The controller module 20 can optionally be further communicatively coupled to the user interface 32 via a second communication line 78.

In non-limiting aspects, a collimator 50 can optionally be disposed between the light source 39 and the electrochromic device 40. In non-limiting aspects, the collimator 50 can be arranged to collimate and converge the first light 39a light emitted from the light source 39 and direct the first light 39a into the electrochromic device 40. In some non-limiting aspects, the collimator 50 can include a first lens 51, such as a collimating lens and/or a focus lens. In non-limiting aspects, the electrochromic device 40 can be disposed a focal plane of the first lens 51. Additionally, or alternatively, in non-limiting aspects, a second lens 52, such as a light emissive or projection lens, can be disposed at the opposite side (i.e., an output side) of the electrochromic device 40 to emit the second light 40a outward from the lighting device 23.

The electrochromic device 40 is arranged to provide selectively alterable light transmission characteristics in response to the first voltage V1 and the second voltage V2 applied thereto. The electrochromic device 40 can include a first substrate 41 (e.g., a glass substrate), a transparent first conductive layer 43 (e.g., a first electrode), an electrochromic layer 44, an ion conducting layer 45 (e.g., an electrolyte layer), a counter electrode layer 46 (e.g., a secondary redox-active layer), a transparent second conductive layer 47 (e.g., s second electrode) and a second substrate 42 (e.g., a second glass substrate), arranged in sequence. The ion conducting layer 45 can be disposed between the electrochromic layer 44 and the counter electrode layer 46. The electrochromic layer 44 can be disposed between the first conductive layer 43 and the ion conducting layer 45.

In aspects, the first conductive layer 43 and ion conducting layer 45 can be optically transparent. The ion conducting layer 45 can be conductive to ions and resistive to electrons. The ion conducting layer 45 can provide ionic transport for electrochemical oxidation and reduction of the electrochromic material 44a. For example, in non-limiting aspects, the ion conducting layer 45 can comprise solid-state polymers intercalated with mobile ions, such as poly(ethylene oxide) saturated with lithium chlorate.

The counter electrode layer 46 is configured to enable an electrochemical reaction opposing that of the electrochromic layer 44. The counter electrode layer 46 can be disposed on the reverse side of the ion conducting layer 45 (i.e., opposing the electrochromic layer 44). In non-limiting aspects, the second conductive layer 47 can be disposed on the counter electrode layer 46. In some non-limiting aspects, the counter electrode layer 46 can also be electrochromically active. For example, the counter electrode layer 46 can exhibit optical properties complementary to the electrochromic layer 44. For instance, if the electrochromic layer 44 is colored in an oxidized state, the opposing counter electrode layer 46 can be transparent when reduced, and vice versa. In other non-limiting aspects, the counter electrode layer 46 may not be electrochromically active. For example, the counter electrode layer 46 can be transparent in both an oxidized state and a reduced state.

The electrochromic layer 44 can comprise an electrochromic material 44a. In non-limiting aspects, the electrochromic material 44a can comprise one or more of a transition metal oxide, conjugated polymer, metal-coordinated complexes and organic molecules, and combinations thereof. For example, in non-limiting aspects, the electrochromic material 44a can optionally be a transition metal oxide, such as without limitation, tungsten trioxide ($WO_3$), molybdenum trioxide ($MoO_3$), iridium (IV) oxide ($IrO_2$), nickel (II) oxide (NiO)V, and vanadium pentoxide ($V_2O_5$) and combinations thereof. In non-limiting aspects, the electrochromic material 44a can be doped with a conduction ion such as a lithium cation ($Li+$) or a hydrogen ion ($H+$). The ion conducting layer 45 can transport protons ($H+$), which are supplied by the ion storage or counter electrode layer 46, into the electrochromic material 44a.

In operation, the controller module 20 can be arranged, based on a predetermined condition, to selectively operate or trigger, the second energy source 72 to apply the third voltage V3 to the light source 39. The light source 39 can be configured to emit a first light 39a in response to the applied third voltage V3 in a known manner. While FIG. 4 depicts the light source 39 schematically as a conventional light emitting diode (LED), other aspects are not so limited. In various non-limiting aspects, the light source can comprise other light emitting devices including, without limitation, incandescent, halogen, neon, or fluorescent lamps, and various combinations thereof. In other aspects, any other desired light emitting device can be used without departing from the scope of the disclosure. Additionally, while FIG. 4 depicts the light source 34 as a single LED, in other aspects, the light source 39 can comprise any desired number of light emitting devices, including an array of light sources 39.

The controller module 20 can be further arranged, in response to data or an input signal received from at least one of the sensors 33, the memory 37, or user interface 32 (e.g., based on a predetermined condition), to selectively operate or trigger the first energy source 71 to apply or provide the first voltage V1 to the first conductive layer 43. Additionally, or alternatively, the controller module 20 can likewise be arranged, based on an input signal received from at least one of the sensors 33, the memory 37, or user interface 32 (e.g., based on a predetermined condition), to selectively operate or trigger the first energy source 71 to apply or provide the second voltage V2 to the first conductive layer 43. In this sense, the controller module 20 is arranged to selectively trigger the at least one energy source 71, 72 to provide at least one of the first voltage V1, and the second voltage V2 to the electrochromic device 40 based on a predetermined condition.

In response to the at least one least one of the first voltage V1, and the second voltage V2, the electrochromic device 40 is configured to modify at least one of an opacity of the electrochromic material 44a, a color of the first light 39a, a color temperature of the first light 39a, and a dispersion of the first light 39a, to define the second light 40a emitted from the lighting device 23. The at least one of the opacity of the electrochromic device 40, the color of the second light 40a, the color temperature of the second light 40a, and the dispersion of the second light 40a can be based on the first magnitude and polarity of the first voltage V1 or the second magnitude and polarity of the second voltage V2, or both.

In non-limiting aspects, the controller module 20 can be arranged to selectively trigger the first energy source 71 to alter or modify the first magnitude of the first voltage V1 or the second magnitude of the second voltage V2, or both, based on data or a second input received from at least one of the sensor 33, memory 37, and user interface 32.

In some aspects, the first voltage V1 can define a forward bias voltage. The first voltage V1 can be provided to the first conductive layer 43 via the first conductive line 74. In response to the applied first voltage V1, the visible light transmission of the electrochromic device 40 can decrease to define a first light intensity distribution pattern. For example, in non-limiting aspects, in the event the first voltage V1 is applied to the first conductive layer 43, ions in the counter electrode layer 46 are transported across the ion conducting layer 45 into the electrochromic layer 44, thereby causing the electrochromic device 40 to be in a colored state. In some aspects, when the electrochromic device 40 is in a colored state, only a portion of the light exiting from the collimator 50 passes through the electrochromic device 40. In this way, the lighting device 23 can define a first light intensity distribution. In aspects, based on the particular electrochromic material 44a in the electrochromic device 40, and the magnitude or polarity of the first voltage V1, the particular color, color temperature, and diffusion of the second light 40a can be predetermined.

In some aspects, the second voltage V2 can define a reverse bias voltage. The second voltage V2 can be provided to the second conductive layer 47 via the second conductive line 75. In response to the applied second voltage V2 the visible light transmission of the electrochromic device 40 can increase to define a second light intensity distribution pattern. For example, in non-limiting aspects, in the event the second voltage V2 is applied to the second conductive layer 47, ions in the electrochromic layer 44 are transported across the ion conducting layer 45 into the counter electrode layer 46, thereby causing the electrochromic device 40 to be in a bleached state in which most of the focused light exiting from the first lens 51 pass through the electrochromic device 40. In this way, the lighting device 23 can define a second light intensity distribution. In aspects, based on the particular electrochromic material 44a in the electrochromic device 40, and the magnitude or polarity of the second voltage V2, the particular color, color temperature, and diffusion of the second light 40a can be predetermined.

While FIG. 4 depicts the light source 34 schematically as a conventional light emitting diode (LED), aspects are not so limited. In various non-limiting aspects, the light source 34 can comprise other light emitting devices including, without limitation, incandescent, halogen, or fluorescent lamps, and combinations thereof. In other aspects, any other desired light emitting device can be used without departing from the scope of the disclosure. Additionally, while FIG. 4 depicts the light source 34 as a single LED, in other aspects, the light source 34 can comprise any desired number of light emitting devices, including an array of light sources 34.

In some aspects, the base 58 can define a heat sink configured to dissipate heat generated by the light device 23 in a known manner. For example, the base 58 can include a set of fins (not shown) extending outwardly therefrom.

Figure 5:
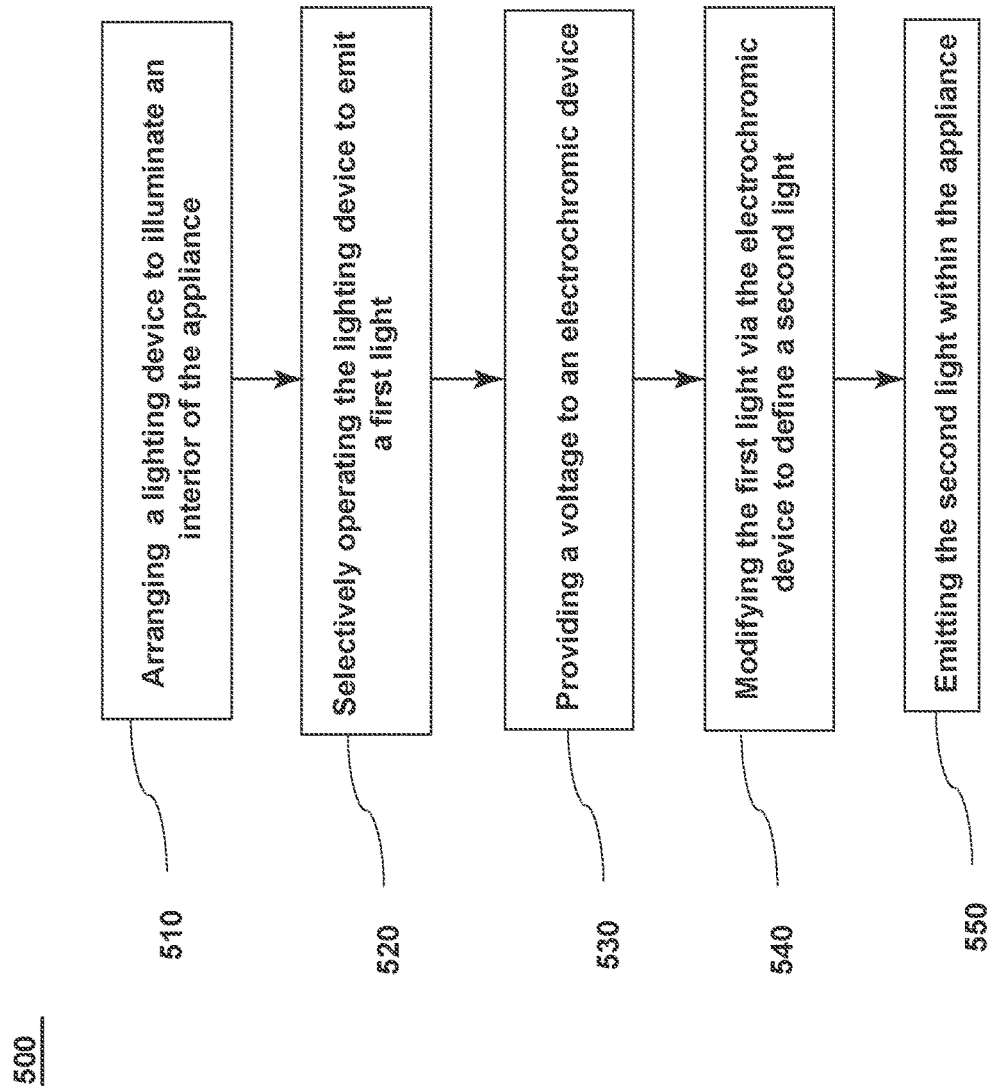
FIG. 5 illustrates a flowchart depicting exemplary steps of a method related to illuminating an interior of a refrigerating appliance in accordance with a non-limiting aspect of the present disclosure.

FIG. 5 illustrates a non-limiting example of a method 500 of to illuminate an interior 13 of a refrigerating appliance 10, for example using the lighting system 48 of FIG. 3. Although the lighting system 48 is described herein in terms of a refrigerating appliance 10, it will be appreciated that the method 500 can be applied to any suitable appliance or system. While the method 500 will be described with reference to the lighting system 48 of FIG. 3, and the refrigerating appliance 10 of FIG. 1, other aspects are not so limited and the method 500 can be implemented using any other lighting system 48 and any other refrigerating appliance 10 without departing from the scope of the disclosure herein.

In non-limiting aspects, the method 500 can begin at 510, by arranging the lighting device 23 within the interior 13 to illuminate the interior 13 of the refrigerating appliance 10.

The lighting device 23 can comprise the light source 39 optically coupled to an electrochromic device 40. The light source 39 can be configured to emit the first light 39a receivable by the electrochromic device 40. The first energy source 71 can be electrically coupled via the first conductive line 74 and the second conductive line 75 to the electrochromic device 40 to selectively provide at least one of the first voltage V1 and the second voltage V2, respectively, to the electrochromic device 40. In non-limiting aspects, the second energy source 72 can be electrically coupled via the set of power lines 73 to the light source 39 to provide the third voltage V3 thereto. The light source 39 can be arranged to illuminate in response to the third voltage V3.

The controller module 20 can be communicatively coupled via a first communication line 38 to the first energy source 71 to selectively control or trigger the first energy source 71 to output or provide at least one of the first voltage V1 and second voltage V2 therefrom. In some non-limiting aspects, the controller module 20 can additionally, or alternatively, be communicatively coupled to the second energy source 72 via a second communication line 36 to selectively control or trigger the output of the third voltage V3 therefrom. The controller module 20 can optionally be further communicatively coupled to the user interface 32 via a second communication line 78.

The method can include, at 520, selectively operating the light source 39 to emit a first light 39a. The first light 39a can have a first color, a first color temperature and a first dispersion. The first light 39a can be provided to, or received by, the electrochromic device 40. For example, in non-limiting aspects, the collimator 50 can be arranged to collimate and converge the first light 39*a* light emitted from the light source 39 and direct the first light 39*a* into the electrochromic device 40.

The method can continue, at 530, by providing at least one of a first voltage V1 and a second voltage V2 to the electrochromic device 40. At 540, the method includes modifying the first light via the electrochromic device 40. For example, in response to the at least one least one of the first voltage V1, and the second voltage V2, the electrochromic device 40 can be configured to modify at least one of an opacity of the electrochromic material 44*a*, a color of the first light 39*a*, a color temperature of the first light 39*a*, and a dispersion of the first light 39*a*, to define the second light 40*a*. The at least one of the opacity of the electrochromic device 40, the color of the second light 40*a*, the color temperature of the second light 40*a*, and the dispersion of the second light 40*a* can be based on the first magnitude and polarity of the first voltage V1 or the second magnitude and polarity of the second voltage V2, or both. In non-limiting aspects, the controller module 20 can be arranged to selectively trigger the first energy source 71 to alter or modify the first magnitude of the first voltage V1 or the second magnitude of the second voltage V2, or both, based on data or a second input received from at least one of the sensors 33, memory 37, and user interface 32. In non-limiting aspects, the color of the second light 40*a*, the color temperature of the second light 40*a*, and the dispersion of the second light 40*a* can be indicative of a status of the refrigerating appliance 10. Additionally, or alternatively the color of the second light 40*a*, the color temperature of the second light 40*a*, and the dispersion of the second light 40*a* can be selected by a user. In some aspects, the providing a voltage to the electrochromic device 40 can comprise receiving an input at the controller module 20, from at least one of the sensor 33, the memory 37, and the user interface 33; and providing the at least one least one of the first voltage V1, and the second voltage V2 based on the received input.

The method can continue, at 550, emitting the second light 40*a* from the lighting device 23 to illuminate the interior.

The sequence depicted is for illustrative purposes only and is not meant to limit the method 500 in any way as it is understood that the portions of the method can proceed in a different logical order, additional or intervening portions can be included, or described portions of the method can be divided into multiple portions, or described portions of the method can be omitted without detracting from the described method.

To the extent not already described, the different features and structures of the various aspects can be used in combination with each other as desired. That one feature is not illustrated in all the aspects is not meant to be construed that it is not included, but is done for brevity of description. Thus, the various features of the different aspects can be mixed and matched as desired to form new aspects of the disclosure, whether the new aspects are expressly described. All combinations or permutations of features described herein are covered by this disclosure.

This written description uses examples to disclose aspects of the disclosure, including the best mode, and to enable any person skilled in the art to practice the aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A refrigerating appliance, comprising:
a cabinet defining an interior;
a door coupled to the cabinet and configured to moveably open and close the interior;
a lighting device arranged to operatively illuminate the interior based on a predetermined condition, the lighting device comprising a light source and an electrochromic device, the light source arranged to selectively provide a first light to the electrochromic device, the electrochromic device selectively operable to emit a second light within the interior;
at least one energy source coupleable to the lighting device and the electrochromic device;
a controller module communicatively coupled to the at least one energy source, and configured to selectively trigger the at least one energy source to provide at least one of a first voltage having a first magnitude and a second voltage having a second magnitude to the electrochromic device; and
wherein, in response to the at least one of a first voltage and a second voltage, the electrochromic device is configured to modify at least one of an opacity of the electrochromic device, a color of the first light, a color temperature of the first light, and a dispersion of the first light, to define the second light.

2. The refrigerating appliance of claim 1, wherein the at least one of the opacity of the electrochromic device, a color of the second light, a color temperature of the second light, and a dispersion of the second light are based on at least one of the first magnitude of the first voltage and the second magnitude of the second voltage.

3. The refrigerating appliance of claim 2, wherein the at least one of the opacity of the electrochromic device, a color of the second light, a color temperature of the second light, and a dispersion of the second light are indicative of a status of the refrigerating appliance.

4. The refrigerating appliance of claim 1, wherein the controller module is arranged to selectively trigger the at least one energy source to provide the at least one of a first voltage, and a second voltage to the electrochromic device based on a first input signal received from at least one of a sensor, a memory, and a user interface.

5. The refrigerating appliance of claim 4, wherein the controller module is further arranged to selectively trigger the at least one energy source to modify at least one of the first magnitude of the first voltage and the second magnitude of the second voltage to the electrochromic device based on a second input received from at least one of the sensor, memory, and user interface.

6. The refrigerating appliance of claim 4, wherein the at least one of the opacity of the electrochromic device, a color of the second light, a color temperature of the second light, and a dispersion of the second light are selectable by a user via the user interface.

7. The refrigerating appliance of claim 1, wherein the predetermined condition comprises a position of the door.

8. The refrigerating appliance of claim 1, wherein the controller module is further configured to selectively trigger the at least one energy source to provide a third voltage to the light source.

9. The refrigerating appliance of claim 1, further comprising a compartment within the interior; and wherein the lighting device is arranged to illuminate the compartment.

10. The refrigerating appliance of claim 1, wherein the light source comprises at least one of a light emitting diode (LED), an incandescent lamp, halogen lamp, neon lamp, and fluorescent lamp.

11. A lighting system for a refrigerating appliance, comprising:
- a lighting device mountable in an interior of the refrigerating appliance, to operatively illuminate the interior based on a predetermined condition, the lighting device comprising a light source and an electrochromic device, the light source configured to selectively provide a first light to the electrochromic device, the electrochromic device selectively operable to emit a second light to the interior;
- at least one energy source coupleable to the lighting device and the electrochromic device;
- a controller module communicatively coupled to the at least one energy source and configured to selectively trigger the at least one energy source to provide at least one of a first voltage and a second voltage to the electrochromic device based on the predetermined condition; and
- wherein, in response to the at least one of a first voltage and a second voltage the electrochromic device is configured to modify at least one of an opacity of the electrochromic device, a color of the first light, a color temperature of the first light, and a dispersion of the first light, to define the second light.

12. The lighting system of claim 11, wherein the at least one of the opacity of the electrochromic device, a color of the second light, a color temperature of the second light, and a dispersion of the second light are based on at least one of a first magnitude of the first voltage and a second magnitude of the second voltage.

13. The lighting system of claim 11, wherein the controller module is arranged to selectively trigger the at least one energy source to provide the at least one of a first voltage having a first magnitude, and a second voltage having a second magnitude to the electrochromic device based on a first input received from at least one of a sensor, a memory, and a user interface.

14. The lighting system of claim 13, wherein the controller module is further arranged to selectively trigger the at least one energy source to modify at least one of the first magnitude of the first voltage and the second magnitude of the second voltage based on a second input received from at least one of the sensor, memory, and user interface.

15. The lighting system of claim 13, wherein the at least one of the opacity of the electrochromic device, a color of the second light, a color temperature of the second light, and a dispersion of the second light are selectable by a user via the user interface.

16. The lighting system of claim 13, wherein the at least one of the opacity of the electrochromic device, a color of the second light, a color temperature of the second light, and a dispersion of the second light are indicative of a status of the refrigerating appliance.

17. A method of illuminating an interior of a refrigerating appliance comprising a lighting device disposed within the interior, the lighting device including a light source optically coupled to an electrochromic device, and selectively operable to provide a first light to the electrochromic device, and to emit a second light therefrom, the method comprising:
- selectively operating the lighting device to emit the first light;
- providing at least one of a first voltage and a second voltage to the electrochromic device;
- modifying at least one of an opacity of the electrochromic device, a color of the first light, a color temperature of the first light, and a dispersion of the first light, to define the second light; and
- emitting the second light within the interior.

18. The method of claim 17, wherein the providing at least one of a first voltage and a second voltage to the electrochromic device comprises receiving an input from at least one of a sensor, a memory, and a user interface, and providing the at least one of a first voltage and a second voltage to the electrochromic device based on the input.

19. The method of claim 18, wherein the input is indicative of a status of the refrigerating appliance 10.

20. The method of claim 17, wherein at least one of a color of the second light, a color temperature of the second light, and a dispersion of the second light, is selectable by a user.

* * * * *